United States Patent [19]

Wittmann

[11] 3,814,568

[45] June 4, 1974

[54] METHOD AND APPARATUS FOR INCINERATING LIQUIDS

[75] Inventor: Thomas J. Wittmann, Dayton, Ohio

[73] Assignee: Systems Technology Corporation, Dayton, Ohio

[22] Filed: May 25, 1973

[21] Appl. No.: 364,005

[52] U.S. Cl.......................... 431/7, 110/75, 431/170
[51] Int. Cl............................................. F23d 21/00
[58] Field of Search .................. 431/170, 328, 7, 2; 110/285, 75; 122/7 C

[56] References Cited
UNITED STATES PATENTS

| | | | |
|---|---|---|---|
| 1,552,677 | 9/1925 | Clawson | 431/170 |
| 3,695,810 | 10/1972 | Heagler | 431/7 X |
| 3,737,283 | 6/1973 | Nikles | 431/170 |

*Primary Examiner*—Edward G. Favors
*Attorney, Agent, or Firm*—Biebel, French & Bugg

[57] ABSTRACT

A method and apparatus for incinerating liquid waste materials. The incinerator of the present invention has a heated combustion bed of aggregate particles contained in a combustion vessel. The vessel is agitated by mechanical means to provide a constant motion to the particles in the bed. The aggregate particles are of relatively large size to eliminate the likelihood of solidification of the aggregate on shut down. Liquid waste materials, which may vary widely in viscosities and may contain widely varying concentrations of solid matter, are introduced into the combustion vessel and incinerated therein. Exhaust means are provided.

13 Claims, 2 Drawing Figures

PATENTED JUN 4 1974　　　　　　　　　　　　3,814,568

METHOD AND APPARATUS FOR INCINERATING LIQUIDS

BACKGROUND OF THE INVENTION

The present invention relates to a method and apparatus for disposing of liquid waste materials, and more particularly to the use of an improved incinerator of the aggregate bed type for incineration of industrial liquid waste.

New laws and regulations require that industrial liquid wastes be disposed of in a manner protective for our environment. One method of disposing of combustible industrial wastes such as oils, solvents, paint thinners, etc. is by the use of incineration. This technique has been used over a number of years, and its popularity continues to grow as the disposal laws tighten. However, there are a number of problems associated with incineration of industrial liquid waste.

Much of the equipment available for liquid incineration uses pressure or steam atomization to break the waste stream into small droplets which are then combusted. This process requires that the liquid waste be pumped through small diameter orifices or nozzles in order to accomplish the atomization. However, many of the waste liquids requiring incineration are heavily contaminated with solid material which can readily plug these orifices. In addition, there are many liquid wastes that are too viscous to be pumped and atomized through the nozzles.

Another technique used is to pump the liquid over a spinning surface, such as a plate or a cone, which produces a centrifugal force that will separate the liquid into a series of droplets. This technique, however, does not disperse the liquid in as fine droplets as those generated by the atomization method. Furthermore, this technique is also limited to the incineration of materials having a sufficient viscosity for drop formation.

Still another disadvantage of the two aforementioned techniques is that the basic heat transfer in the combustion process occurs across a liquid-gas interface. This type of combustion is less effective than could be accomplished if the transfer was across a liquid-solid interface and if the solid media had a large thermal mass.

A technique used to overcome many of the above noted problems is the fluidized bed incinerator. That is, a bed of sand is placed in a cylindrical vessel on top of a series of air tuyeres. Compressed air is passed up through the bed of said until the flow rate of the air is sufficient to float the sand bed in a boiling manner. When this state occurs, the bed is said to be fluidized, and it assumes the mechanical properties of a fluid. When used in an incinerator, the fluidized bed becomes the combustion chamber. First, the bed is preheated to combustion temperature (approximately 1,300°–1500° F) by adding fuel to the bed or by the application of preheated air to the fluidized bed. When combustion temperature is reached, the waste liquids are injected into the bed and incineration occurs.

There are several significant advantages to this approach. The first is that the liquids injected into the bed need not be atomized. The injection can be accomplished by simply pumping the liquid through pipes with a diameter as large as an inch or more. The actual dispersing of the liquid is accomplished by the turbulent motion of the fluidized sand particles. A second major advantage is that the heat transfer is accomplished across a liquid-solid interface. A third significant advantage is that the preheated fluidized bed has a large thermal mass and is less susceptible to changes in the heat content of the feed stock than any conventional incinerator using atomization techniques where the thermal mass is that of the gases in the combustion chamber. Another significant advantage of the fluidized bed concept is that it is not severly limited by the viscosity of the materials being incinerated. Since the liquid waste materials need not be pumped through an orifice or nozzle, the presence of highly viscous liquids or solid materials in the feed stock is not a problem. In fact, the fluidized bed incinerator can be used for the disposal of slurries and sludges and even solids.

With all of these advantages, there still remain several disadvantages to the heretofore known fluidized bed incinerators. One problem is that the units currently available are large and expensive.

A major problem, however, pertains to the possibility of the fluidized bed solidifying after the incinerator has shut down. This pehonomena can occur when there is an agglomeration of materials on the bed particles and when the material forming the agglomeration has a melting point lower than the operating temperature of the incinerator. When this happens, the material forming the agglomeration around the bed particles will tend to fuse together when the incinerator has been shut down and the bed temperature drops below the melting point of the agglomerated material. As this occurs, the bed then becomes one solid mass, and obviously fluidization is not possible on start up. This generally requires that the bed be mechanically broken up, removed and replaced. The bed solidification problem is a significant one when the incinerator is used for a wide variety of liquid wastes, some of which are likely to be materials that could cause this problem.

Another problem with fluidized bed type incinerators is that because the combustion air must also fluidize the bed, the air flow rate must be within a set range. If the combustion air flow is too low, the bed will not be fluidized. On the other hand, if the combustion air flow is too high, the fluid motion of the bed will be disrupted.

SUMMARY OF THE INVENTION

In accordance with the present invention, an incinerator is provided which will incorporate many of the advantages of the fluidized bed while at the same time solving some of the disadvantages of this approach. The incinerator of the present invention has a bed filled with aggregate particles of a fairly large diameter compared to that of the sand particles previously used. The average particle size of the aggregate may vary depending on the type of liquid waste to be incinerated. For example, it may range from the size of "P" gravel, i.e., ⅜ inch in diameter, up to 1 inch or greater in diameter.

The use of such a large sized aggregate particle reduces the contact surface between the aggregate particles and thereby greatly reduces the likelihood of the bed solidifying due to the agglomeration of material on the aggregate. That is, even though there is some solidification of the agglomerate on cooling, the bed as a whole does not solidify to the extent that it cannot be again fluidized on start up.

It is also a feature of the present invention to force combustion air through the bed without requiring the combustion air to fluidize the bed. Rather than flotation of the particles by air, the motion of the bed is achieved by mechanical action. This permits the use of combustion air flow rates outside the limited range necessary for operation of a fluidized bed type incinerator. The bed agitation may be accomplished by placing the bed in a rotating cylinder, by vibratory actions similar to that used in vibrating deburring machines such as those manufactured by Vibrodyne, Inc., Dayton, Ohio, or by any other agitating, vibrating or rolling means.

Accordingly, it is a primary object of the present invention to provide an improved means for incinerating liquid waste materials.

Another object of the invention is to provide an aggregate bed type of incinerator which enjoys all of the advantages of prior fluidized bed incinerators without the accompanying disadvantages.

Another object of the present invention is to provide a novel incinerator having a bed filled with an aggregate of relatively large particle size.

It is still a further object of this invention to provide an aggregate bed typ incinerator wherein the constant motion of the aggregate is accomplished by means of mechanical agitation.

Other objects and advantages of the present invention will be apparent from the following description, the accompanying drawings and the appended claims.

DESCRIPTION OF THE PREFERRED EMBODIMENT

Figures 1, 2:
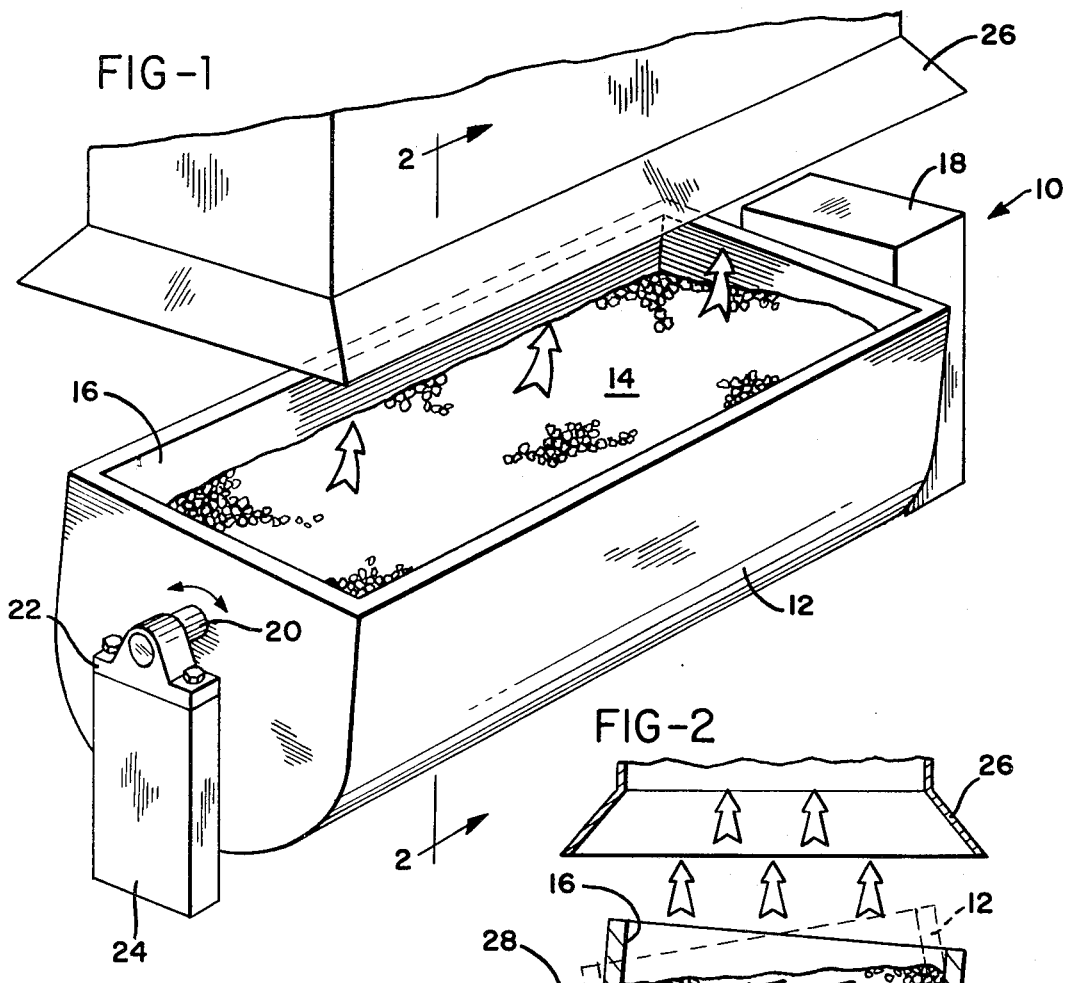
FIG. 1 is a perspective view of an incinerator bed constructed in accordance with the invention.
FIG. 2 is a cross-sectional view taken along the lines 2—2 of FIG. 1.

Referring to FIG. 1, which illustrates a preferred embodiment of the invention, there is shown an incinerator 10 having a combustion vessel 12 made of or lined with a high melting point metal or refractory material. Vessel 12 contains a combustion bed 14 of the aggregate particles.

The particles may be any high melting point material which can be heated, non-destructively, to the combustion temperature and which can withstand the agitation within the combustion vessel 12. Gravel, stones, ceramic particles, and certain metal chips are examples of the type of aggregate particles that may be used. In accordance with the present invention, the particles have a desired average particle size significantly larger than sand particles. The size of aggregate required for a particular bed depends on the type of material to be incinerated. For example, liquids having a high viscosity and/or containing large amounts of solid matter should be incinerated in a bed containing larger aggregate particles than those liquids having a fairly low viscosity. Similarly, the particle size required varies depending upon the combustion temperature of the particular liquid wastes being incinerated. Generally, however, it may range from ⅜ to 1 inch or more in diameter.

In addition to reducing the contact surface between the aggregate particles, the large aggregate particles have a larger thermal mass per particle than sand. This means that each particle after shut down retains enough heat to incinerate the coating or waste material which forms around each particle. The whole aggregate bed also has a relatively large thermal mass which will preclude rapid cooldown if the unit is shut off overnight. This reduces thermal shock to the material of the wall 16 (FIG. 2) of combustion vessel 12, and the heat retained by the thermal mass reduces the required heat input to re-startup conditions the next morning. As noted, the wall 16 of vessel 12 may be wholly a refractory material or may merely have a refractory lining.

The aggregate particles which make up the combustion bed 14 are mechanically agitated by control means 18 in order to provide a constant movement of the particles within the combustion bed 14. The motion of such particles is illustrated in FIG. 2 by the solid directional arrows within the bed. This orbital or rotating motion of the aggregate particles distributes the liquid waste material throughout the combustion zone. The control means 18 may be any type of drive mechanism which will mechanically vibrate, oscillate or rotate the combustion vessel around the axis of shaft 20, which is supported by support bearing 22 and support post 24.

A number of mechanical agitating means are available, including hydraulic, pneumatic, electromechanical, and electromagnetic devices. Any of the mentioned mechanical agitating means may be used, as may other means as should be apparent to those skilled in the art. As an example, the control means 18 may be a timer controlled electromagnetic vibration system which is capable of vibrating the combustion vessel 12 at 3,600 cycles per minute, has a variable amplitude of vibration, and a variable shake force of up to 75 Gs. One such system is sold by Vibrodyne, Inc. of Dayton, Ohio for use in vibratory deburring and finishing machines.

It should be apparent that a rotating cylinder, such as that used in a ball mill, may also be used. In such instances the combustion vessel would be a closed vessel with inlet means for the liquid waste and combustion air and outlet means for the exhaust gases. In any event, it is necessary to provide a venting system to provide an exhaust for the combustion gases produced by incineration. In a bed type incinerator, such as combustion vessel 12, such an exhaust means may be a hood 26 which is vented to the stack. Other known exhaust means may also be adapted to the combustion vessel of the present invention.

The combustion bed 14 may be preheated through the use of oil or some other fuel. Upon reaching the combustion temperature (approximately 1,300°–1,500° F) the liquid waste material is injected into the aggregate bed through pipe 28. The air necessary to support combustion may be introduced through line 30. In addition, if needed to maintain the combustion within the bed, the air introduced through line 30 may be heated to the combustion temperature. If desired, such hot combustion air may be used to preheat the combustion bed 14 rather than adding fuel to the bed. The combustion air may be heated by a number of known means, such as flame or electrical furnace, and line 30 may be in the form of air tuyeres. Line 30 may also be used to introduce combustible fuels along with the air. This is another means of maintaining the combustion if the liquid waste material itself will not support the combustion.

It should be emphasized, however, that while the combustion air joins the fluid movement of the aggregate particles upon being introduced into the bed, the combustion air itself does not fluidize the bed. Thus, it is possible to have a wider range control of the combustion air volume flow rate than it is if the bed were fluidized by the air. This permits the use of less air than would ordinarily be needed to fluidize the bed when that amount of air is sufficient for heating purposes. Likewise, if it is desirable to use more air than normally is used to fluidize the sand beds, this can be done without endangering the disruption of the constant motion.

As is apparent from the above description, the liquid incinerator of the present invention has many of the advantages of prior fluidized bed incinerators, including the fact that the integrity of the combustion chamber is not broken since there is no need for moving elements in the bed; the heat transfer mechanism is between a liquid-solid interface; no nozzle is required for atomization since the waste material is dispersed by the movement of the aggregate particles; there is a large thermal mass that will aid in the combustion process as the heat volume of the feed stock varies; and the large thermal mass precludes rapid cool-down of the unit.

In addition, the incinerator of the present invention has a number of advantages not found in known fluidized bed incinerators. There is no need for air to fluidize the bed, thus permitting a wider range of control of the combustion air volume flow rate. Also the use of relatively large diameter particles reduces the contact surface between the aggregate particles, and this reduces the likelihood of the bed solidifying due to the agglomeration of material from the waste liquids on the aggregate particles.

It is also an advantage of the instant invention that liquid incinerators as described may be built in a wide variety of sizes down to very small units for use as captive incinerators for the disposal of limited amounts of liquid waste from individual facilities. Likewise, it is possible to incinerate sludges, slurries, and other liquid wastes containing solid matter with the present incinerator. The incinerator concept of the present invention is adaptable to a wide range of waste materials having widely varying viscosities, including liquids having widely varying concentrations of solid matter present. In particular, it is especially adaptable to the processing of sludge from waste water treatment plants.

While the methods and forms of apparatus herein described constitute preferred embodiments of the invention, it is to be understood that the invention is not limited to these precise methods and forms of apparatus, and that changes may be made therein without departing from the scope of the invention, which is defined in the appended claims.

What is claimed is:

1. Apparatus for incineration of liquid waste materials comprising a combustion vessel, a combustion bed of aggregate particles having an average particle size substantially larger than the size of sand, mechanical means for agitating said combustion vessel so as to create a constant motion among said particles of said combustion bed, means for preheating the combustion bed to the combustion temperature, means for introducing liquid waste materials into the combustion vessel, and means for maintaining the combustion bed at said combustion temperature.

2. Apparatus as set forth in claim 1 wherein said aggregate particles have an average particle size larger than ⅜ inch in diameter.

3. Apparatus as set forth in claim 1 wherein said aggregate particles have an average particle size determined by the viscosity and combustion temperature of said liquid waste materials.

4. Apparatus as set forth in claim 1 wherein said combustion vessel is an open container having an inner wall of refractory material and shaped in the form of a hollow cylinder halved along a major axis and mounted open side up.

5. Apparatus as set forth in claim 4 wherein said means for agitating said combustion vessel comprises means for vibrating said vessel about the axis thereof.

6. Apparatus as set forth in claim 1 further including exhaust means for venting the combustion gases produced by the incineration of said liquid wastes.

7. Apparatus as set forth in claim 1 wherein said means for maintaining the combustion bed at said combustion temperature includes means for introducing heated air into said combustion vessel.

8. Apparatus as set forth in claim 1 wherein said means for maintaining the combustion bed at said combustion means for maintaining the combustion bed at said combustion temperature includes means for introducing a fuel and air mixture into said combustion vessel.

9. Apparatus as set forth in claim 1 wherein said means for preheating the combustion bed comprises means for introducing and igniting a fuel in the combustion bed.

10. Apparatus as set forth in claim 1 wherein said means for preheating the combustion bed comprises means for introducing heated air into said combustion vessel.

11. A method for incinerating liquid waste materials comprising the steps of:

preheating a combustion bed of aggregate particles having an average particle size substantially larger than the size of sand, said particles contained in a combustion vessel, mechanically agitating said combustion vessel so as to create a constant motion among said particles, injecting liquid waste materials to be incinerated into said combustion vessel, maintaining said heated combustion bed at the combustion temperature.

and thereby incinerating said liquid waste materials in said combustion vessel.

12. A method according to claim 10 wherein said agitation comprises oscillatory vibration of said combustion vessel.

13. A method according to claim 10 wherein said liquid waste is a sludge.

* * * * *